(12) United States Patent
Wei et al.

(10) Patent No.: US 11,071,190 B2
(45) Date of Patent: Jul. 20, 2021

(54) ELECTROSTATIC DISCHARGE DEVICE

(71) Applicants:MIDAS WEI TRADING CO., LTD., Taipei (TW); CHAMPION ELITE COMPANY LIMITED, Tortola (VG)

(72) Inventors: Tao-Chin Wei, Taipei (TW); Yuan-Ping Liu, Taipei (TW); Yi Cheng Liu, Taipei (TW)

(73) Assignees: Midas Wei Trading Co., Ltd., Taipei (TW); Champion Elite Company Limited, Tortola (VG)

( * ) Notice: Subject to any disclaimer, the term of this patent is extended or adjusted under 35 U.S.C. 154(b) by 251 days.

(21) Appl. No.: 16/402,578

(22) Filed: May 3, 2019

(65) Prior Publication Data

US 2020/0236766 A1 Jul. 23, 2020

(30) Foreign Application Priority Data

Jan. 22, 2019 (TW) .................................. 108102443

(51) Int. Cl.
*H05F 3/04* (2006.01)
*F16L 57/00* (2006.01)

(52) U.S. Cl.
CPC ................ *H05F 3/04* (2013.01); *F16L 57/00* (2013.01)

(58) Field of Classification Search
CPC .................................. H05F 3/04; F16L 57/00
See application file for complete search history.

(56) References Cited

U.S. PATENT DOCUMENTS

| 4,104,695 A * | 8/1978 | Hollis ....................... H05F 3/00 |
| | | 361/220 |
| 5,490,033 A * | 2/1996 | Cronin ............... H01R 13/6485 |
| | | 361/212 |
| 7,054,129 B2 * | 5/2006 | Aida ........................ H05F 3/04 |
| | | 361/220 |

OTHER PUBLICATIONS

Reducing ESD in semiconductor fluoropolymer fluid handling systems while maintaining chemical purity M. Caulfield, J. Leys, J. Linder, Brett Reichow (Year: 2016).*

* cited by examiner

*Primary Examiner* — Adolf D Berhane
*Assistant Examiner* — Afework S Demisse
(74) *Attorney, Agent, or Firm* — Rosenberg, Klein & Lee (57) ABSTRACT

An electrostatic discharge device includes at least two conductive materials and at least one electrostatic eliminating circuit. The conductive materials are attached to the outer wall of an insulating hollow tube. The conductive materials separate from each other and overlap in a radial direction of the insulating hollow tube. Static charges are accumulated on the insulating hollow tube to form an electrostatic voltage across the conductive materials. The electrostatic eliminating circuit is electrically connected to the conductive materials and disconnected from a grounding terminal. The electrostatic eliminating circuit receives and eliminates the static charges through the conductive materials to reduce the electrostatic voltage.

14 Claims, 12 Drawing Sheets

ELECTROSTATIC DISCHARGE DEVICE

This application claims priority for Taiwan patent application no. 108102443 filed on Jan. 22, 2019, the content of which is incorporated by reference in its entirely.

BACKGROUND OF THE INVENTION

Field of the Invention

The present invention relates to a discharge device, particularly to an electrostatic discharge device.

Description of the Related Art

Static electricity is a natural phenomenon in nature. Two electrical neutral objects will transfer electrons after friction, thereby resulting in the generation of static electricity. In tubes made of dielectric material, such as plastic or rubber, static electricity is easily generated to cause danger due to friction between transporting liquid and the walls of the tubes. For example, when the transporting liquid is flammable, static electricity may cause sparks, thereby causing flammable liquid to ignite or even explode. Alternatively, static electricity may directly cause damage to exhausting pumps or delivering pumps connecting to the tubes. In the semiconductor fabrication process, if solvents in the tubes generate static electricity, the static electricity may cause damage to wafers.

There are some ways to reduce the amount of static electricity in tubes.
1. Reduce friction in tubes: Static electricity within tubes is mainly generated by friction. The roughness of the inner wall of the tube influences the amount of static electricity. If there are filters in the tubes, the filters will increase the friction to generate more static charges.
2. Reduce flowing speed: The saturation values of charge density and flowing current generated due to liquid flowing in the tube are positively correlated with the square of the flowing speed of the liquid. Thus, reducing the flowing speed is also a method for rapidly reducing the amount of static electricity.
3. Selection of material of tubes: The degree of eliminating static charges depends on the conductivity and the resistivity of the tube. For liquid with high resistivity, charges are accumulated rather than eliminated. Besides, insulating tubes made of rubber or plastic induces more static charges than conductive tubes made of metal. The insulating tube features an ability of accumulating static charges and induces an electrostatic voltage of above 10 kV. Conductive tubes made of metal can be grounded to reduce static charges, but the metal tubes are not suitable for many occasions. For example, tubes made of rubber or plastic have advantages of light, cheap, isolating, and simple-processing properties. Taking consideration of the cost, tubes made of rubber or plastic may be selected to use. Solvents with strong acids or bases are often found in tubes for semiconductor processes. The strong acids or bases likely corrode the wall of the metal tube to produce residual metal when flowing through the metal tube, thereby causing the failures of semiconductor processes. In such a case, Teflon tubes or carbon nanotubes with high resistivity are required.

Figure 1:
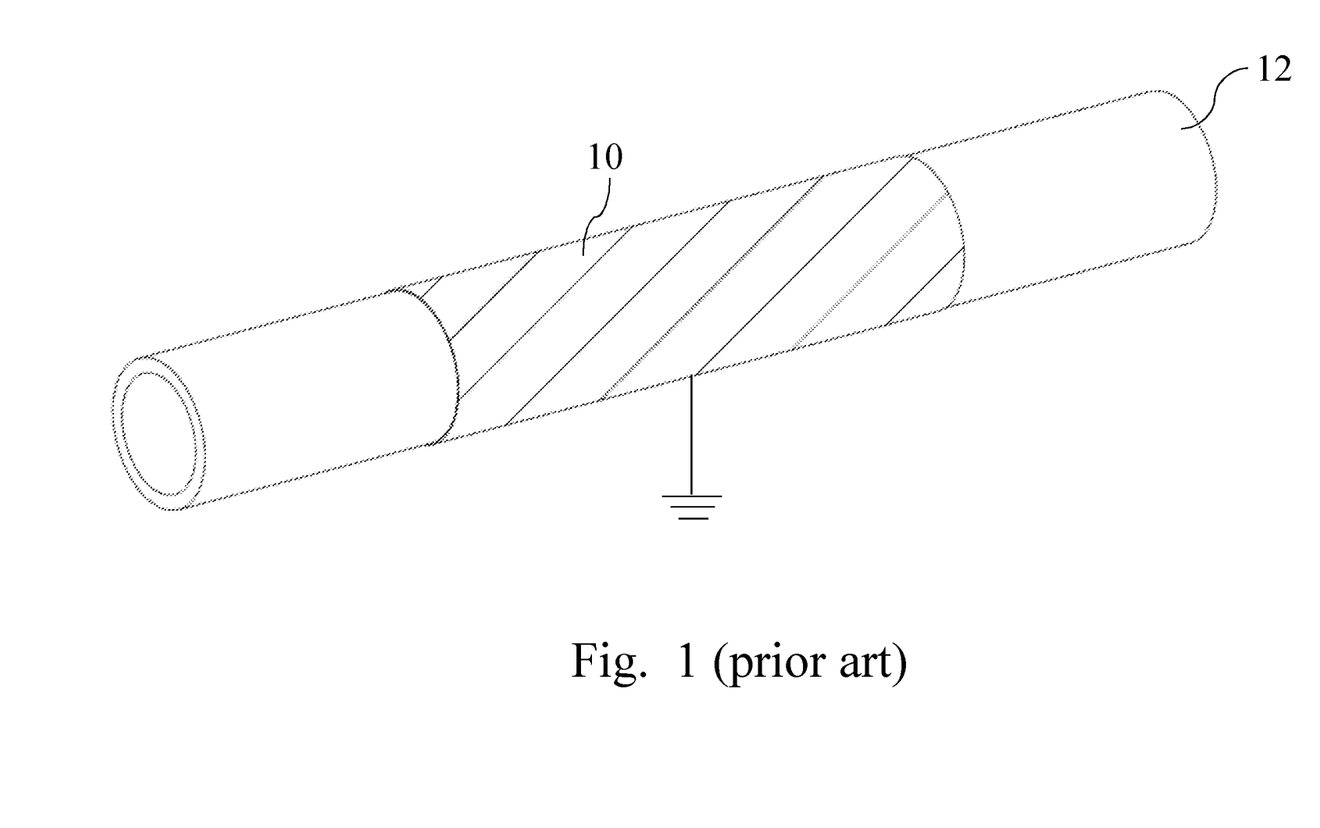
FIG. 1 is a diagram schematically showing an isolating tube and a conductive ring in the conventional technology.

In tubes made of high-resistivity material, static electricity with high voltage is generated due to friction between high-resistivity fluid and the tubes. Since the wall of the tube features high resistivity or isolating properties, grounding the wall of the tube cannot discharge static charges. In the conventional technology, the outer wall of the isolating tube is provided with conductive rings or conductive bands. As shown in FIG. 1, a conductive ring 10 is grounded to eliminate static charges. The isolating liquid passing through isolating tube 12 has a large amount of static electricity above 10 kV. However, the conductive ring 10 has a limited area touching the isolating liquid through the isolating tube 12. Thus, grounding the conductive ring 10 cannot eliminate static charges effectively. Instead, some noises may flow into the conductive ring 10 from the grounding terminal.

Figure 2:
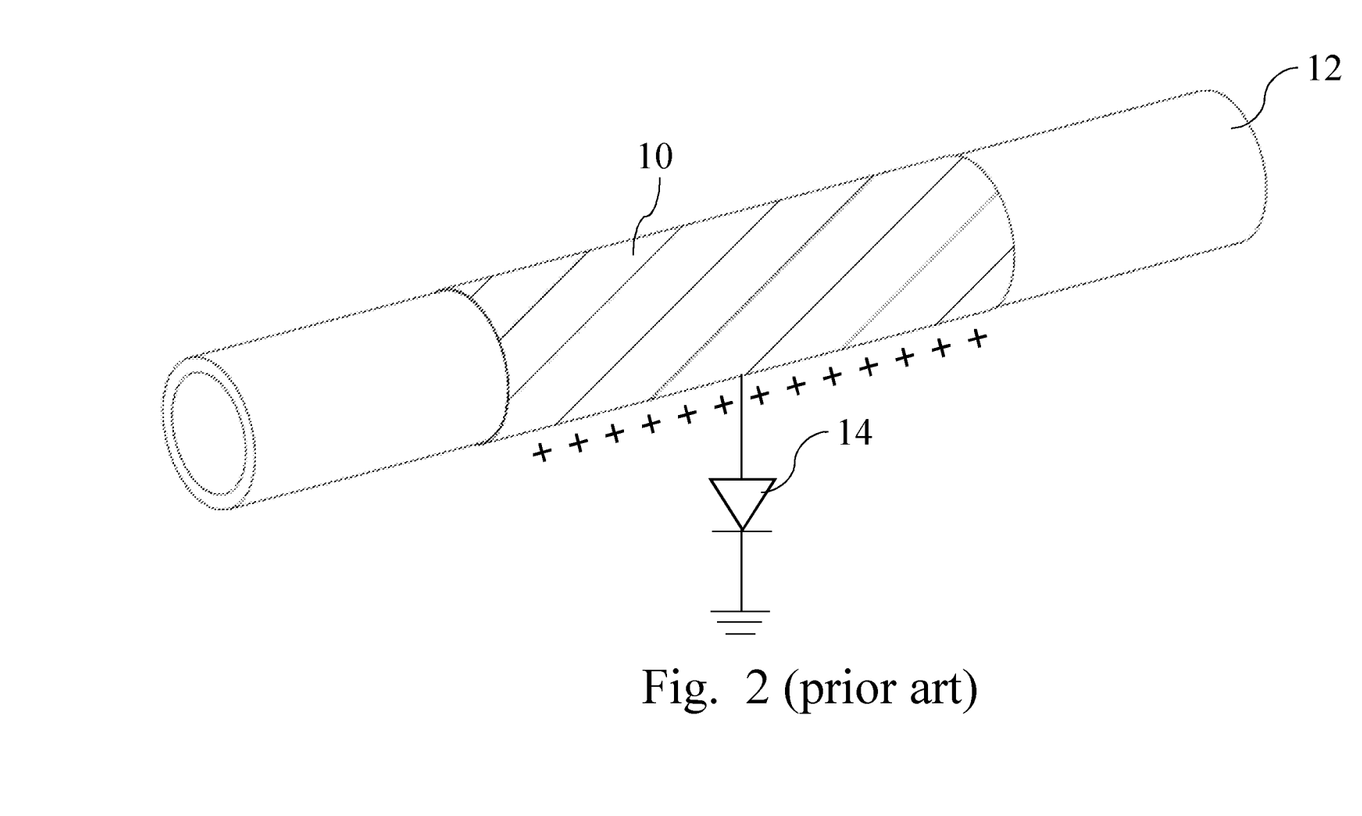
FIG. 2 is a diagram schematically showing an isolating tube, a conductive ring, and a diode in the conventional technology.

To increase the efficiency of eliminating static charges, the area of the conductive ring 10 is increased or many conductive rings 10 are used. In order to overcome the problem with noises flowing into the conductive ring 10 from the grounding terminal, a diode 14 is connected between the conductive ring 10 and the grounding terminal. The direction of the diode 14 is related to the positively-charged or negatively-charged isolating tube 12. If the isolating tube 12 is positively-charged, the anode and the cathode of the diode 14 are respectively connected to the conductive ring 10 and the grounding terminal, as shown in FIG. 2. However, these two solutions still cannot eliminate high-voltage static charges rapidly without receiving noise when the electrostatic voltage is larger than 10 kV.

To overcome the abovementioned problems, the present invention provides an electrostatic discharge device, so as to solve the afore-mentioned problems of the prior art.

SUMMARY OF THE INVENTION

The primary objective of the present invention is to provide an electrostatic discharge device, which uses at least two conductive materials separating from each other to effectively eliminate an ultra-high electrostatic voltage of an isolating hollow tube and avoids the disturbance of noises from a grounding terminal.

To achieve the abovementioned objectives, the present invention provides an electrostatic discharge device, which comprises at least two conductive materials, attached to an outer wall of an insulating hollow tube, separating from each other and overlapping in a radial direction of the insulating hollow tube, static charges are accumulated on the insulating hollow tube to form an electrostatic voltage across the at least two conductive materials; and at least one electrostatic eliminating circuit, electrically connected to the at least two conductive materials and disconnected from a grounding terminal, receiving and eliminating the static charges through the at least two conductive materials to reduce the electrostatic voltage.

In an embodiment of the present invention, the at least one electrostatic eliminating circuit further comprises at least one metal oxide varistor (MOV) having a first end and a second end, and the first end and the second end are respectively electrically connected to the at least two conductive materials; a thermistor having a third end and a fourth end, and the third end is electrically connected to the first end; and at least one gas discharge tube with two ends thereof respectively electrically connected to the fourth end and the second end, and the MOV, the thermistor, and the at least one gas discharge tube receive and eliminate the static charges to reduce the electrostatic voltage when the electrostatic voltage is larger than rated voltages of the MOV and the at least one gas discharge tube.

In an embodiment of the present invention, the thermistor is a positive temperature coefficient (PTC) thermistor or a polymer positive temperature coefficient (PPTC) thermistor.

In an embodiment of the present invention, the at least one gas discharge tube further comprises at least two gas discharge tubes, the rated voltages of the two gas discharge tubes are different, the at least one electrostatic eliminating circuit further comprises a charge-collecting capacitor electrically connected to the at least two gas discharge tubes in parallel, the at least two conductive materials and the insulating hollow tube form an equivalent capacitor, a capacitance value of the charge-collecting capacitor is larger than ten times of a capacitance value of the equivalent capacitor, the static charges transfers from the insulating hollow tube to the charge-collecting capacitor through the thermistor when the electrostatic voltage is less than the rated voltages of the MOV and the at least two gas discharge tubes, and the MOV, the thermistor, and the at least two gas discharge tubes receive and eliminate the static charges to reduce the electrostatic voltage when the electrostatic voltage is larger than the rated voltages of the MOV and the at least two gas discharge tubes.

In an embodiment of the present invention, the electrostatic discharge device further comprises at least two arc conductive plates respectively clamping the insulating hollow tube through the at least two conductive materials; and at least one printed circuit board with a bottom thereof fixed to the at least two arc conductive plates, a top of the at least one printed circuit board is provided with the at least one electrostatic eliminating circuit, and the at least two arc conductive plates are electrically connected to the at least one electrostatic eliminating circuit through the at least one printed circuit board.

In an embodiment of the present invention, the at least two conductive materials are arc metal plates, conductive tapes, conductive adhesives, conductive paint, or piezoelectric ceramic plates.

In an embodiment of the present invention, the electrostatic discharge device further comprises a damping circuit, the at least two conductive materials are piezoelectric ceramic plates, each of the piezoelectric ceramic plates has a first conductive surface and a second conductive surface, the first conductive surface is attached to the outer wall of the insulating hollow tube and electrically connected to the at least one electrostatic eliminating circuit, the second conductive surface of each of the piezoelectric ceramic plates and the grounding terminal are electrically connected to the damping circuit, when the insulating hollow tube generates a vibration strain, the piezoelectric ceramic plates converts the vibration strain into a vibration voltage, and the damping circuit receives and inverts the vibration voltage to reduce the vibration strain.

In an embodiment of the present invention, the piezoelectric ceramic plates and the grounding terminal form a piezoelectric capacitor having a first connecting end and a second connecting end, the first connecting end is electrically connected to the second conductive surface of each of the piezoelectric ceramic plates, the second connecting end is electrically connected to the grounding terminal, the vibration voltage is applied across the first connecting end and the second connecting end, and the damping circuit further comprises a peak sensing circuit, electrically connected to the first connecting end, receiving the vibration voltage, and the peak sensing circuit generates a pulse signal when the vibration voltage reaches a maximum value; an electrical switch electrically connected to the peak sensing circuit and the first connecting end and turned off, and the electrical switch is turned on when the electrical switch receives the pulse signal; and an inductor and a resistor connected in series and electrically connected between the electrical switch and the grounding terminal, the inductor is electrically connected between the resistor and the electrical switch, and the inductor resonates with the piezoelectric capacitor to invert the vibration voltage when the electrical switch is turned on.

In an embodiment of the present invention, the number of the at least two conductive materials is even and larger than two.

In an embodiment of the present invention, the at least two conductive materials are uniformly attached in a circumferential direction of the insulating hollow tube, the at least two conductive materials are symmetric to each other with the insulating hollow tube being an axis, and neighboring two of the at least two conductive materials are respectively electrically connected to two ends of the at least one electrostatic eliminating circuit.

In an embodiment of the present invention, the at least two conductive materials are uniformly attached along a tube axis of the insulating hollow tube and the at least two conductive materials are symmetric to each other with the insulating hollow tube being an axis.

In an embodiment of the present invention, the number of the at least one electrostatic eliminating circuit is larger than one and each of the electrostatic eliminating circuits is electrically connected to two of the conductive materials.

In an embodiment of the present invention, the number of the at least two conductive materials is four, and the radial direction corresponding to two of the conductive materials is perpendicular to the radial direction corresponding to remains of the conductive materials.

In an embodiment of the present invention, each of the at least two conductive materials has a shape of a spiral and the at least two conductive materials are uniformly attached along a tube axis of the insulating hollow tube.

Below, the embodiments are described in detail in cooperation with the drawings to make easily understood the technical contents, characteristics and accomplishments of the present invention.

DETAILED DESCRIPTION OF THE INVENTION

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Figure 3:
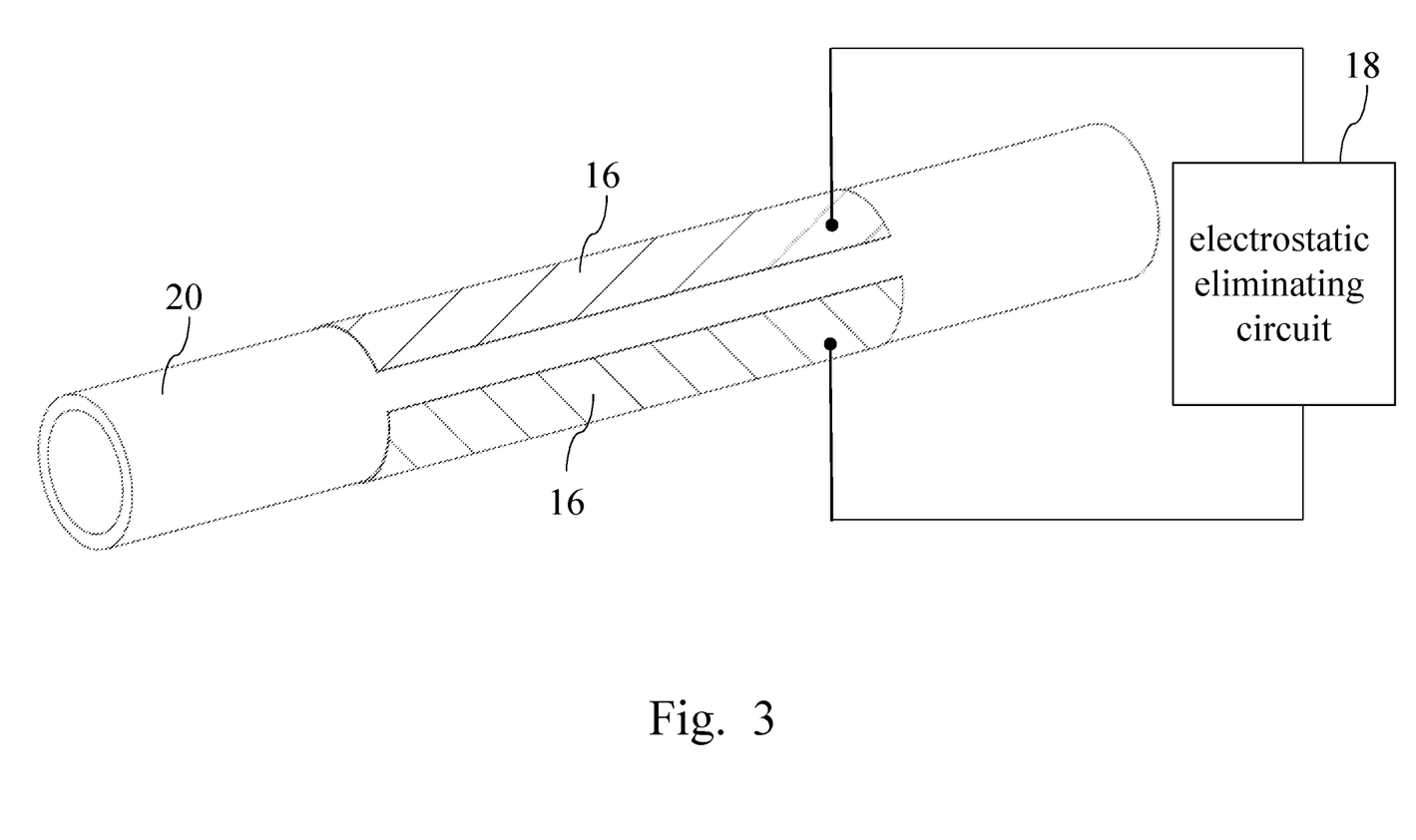
FIG. 3 is a diagram schematically showing an electrostatic discharge device according to the first embodiment of the present invention.

Refer to FIG. 3. The first embodiment of the electrostatic discharge device is introduced as follows. The electrostatic discharge device comprises at least two conductive materials 16 and at least one electrostatic eliminating circuit 18. The conductive materials 16 may be arc metal plates, conductive tapes, conductive adhesives, conductive paint, or piezoelectric ceramic plates, but the present invention is not limited thereto. In the first embodiment, the number of the conductive materials 16 is two, and the number of the electrostatic eliminating circuit 18 is one. The conductive materials 16, separating from each other, are attached to the outer wall of an insulating hollow tube 20. In other words, the conductive materials 16 are not connected to each other. The conductive materials 16 overlap in the radial direction of the insulating hollow tube 20 to produce the capacitance effect. The electrostatic eliminating circuit 18 is electrically connected to all the conductive materials 16 and disconnected from a grounding terminal. When liquid with high resistivity carries static charges to flow through the insulating hollow tube 20, the static charges are accumulated on the insulating hollow tube 20 to generate an electrostatic voltage across the conductive materials 16. Due to the capacitance effect produced by the conductive materials 16, the static charges are discharged to the electrostatic eliminating circuit 18, such that the electrostatic eliminating circuit 18 receives and eliminate the static charges through the conductive materials 16 to reduce the electrostatic voltage. If the electrostatic voltage is very high, the electrostatic voltage is effectively eliminated. In general, the higher the equivalent capacitance of the conductive materials 16, the better the effect for eliminating static charges. When the equivalent capacitance of the conductive materials 16 is higher, the area that the conductive materials 16 overlap in the radial direction of the insulating hollow tube 20 is larger or the sectional diameter of the insulating hollow tube 20 is shorter. Besides, the present invention is different from the way of grounding a conductive ring. The electrostatic eliminating circuit 18 is floating and disconnected from the grounding terminal. Thus, noises cannot flow from the grounding terminal to the electrostatic eliminating circuit 18 and the conductive materials 16.

Figure 4:
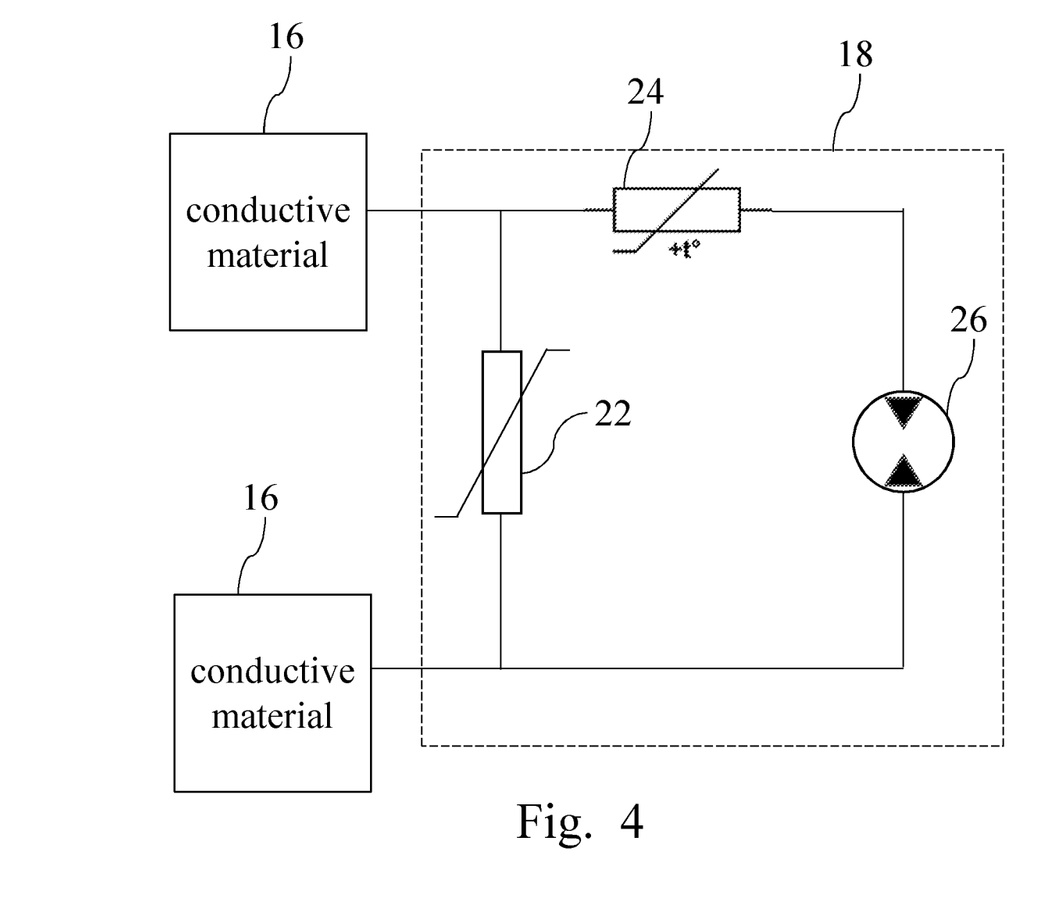
FIG. 4 is a diagram schematically showing an electrostatic eliminating circuit according to an embodiment of the present invention.

Refer to FIG. 4. In an embodiment of the electrostatic eliminating circuit 18, the electrostatic eliminating circuit 18 further comprises at least one metal oxide varistor (MOV) 22, a thermistor 24, and at least one gas discharge tube 26. The thermistor 24 may be a positive temperature coefficient (PTC) thermistor or a polymer positive temperature coefficient (PPTC) thermistor. The number of the MOV 22 is one and the number of the gas discharge tube 26 is one. The MOV 22 has a first end and a second end. The first end and the second end are respectively electrically connected to the two conductive materials 16. The thermistor 24 has a third end and a fourth end, and the third end is electrically connected to the first end of the MOV 22. Two ends of the gas discharge tube 26 are respectively electrically connected to the fourth end of the thermistor 24 and the second end of the MOV 22. The MOV 22, the thermistor 24, and the gas discharge tube 26 receive and eliminate the static charges to reduce the electrostatic voltage when the electrostatic voltage is larger than rated voltages of the MOV 22 and the gas discharge tube 26. The gas discharge tube 26 converts the static charges into light energy to reduce the electrostatic voltage, such that the electrostatic voltage is equal to the rated voltage of the MOV 22 or the gas discharge tube 26. Since insulating hollow tube 20 is difficultly repaired, electrostatic eliminating circuit 18 is designed to guarantee the reliability of the gas discharge tube 26. When the electrostatic voltage is higher than the rated voltage of the gas discharge tube 26, the voltage of the gas discharge tube 26 drops to zero whereby a high current flows through the thermistor 24. Then, when the value of the high current is higher than the trip current value of the thermistor 24, the impedance of the thermistor 24 varies from low to high to block the high current to pass, thereby protecting the gas discharge tube 26.

The operation of the first embodiment is introduced as follows. Refer to FIG. 3 and FIG. 4. When the liquid with high resistivity carries static charges to flow through the insulating hollow tube 20, the static charges are accumulated on the insulating hollow tube 20 to generate the electrostatic voltage across the conductive materials 16. The MOV 22, the thermistor 24, and the gas discharge tube 26 receive and eliminate the static charges to reduce the electrostatic voltage when the electrostatic voltage is larger than the rated voltages of the MOV 22 and the gas discharge tube 26. The gas discharge tube 26 converts the static charges into light energy to reduce the electrostatic voltage.

Figure 5:
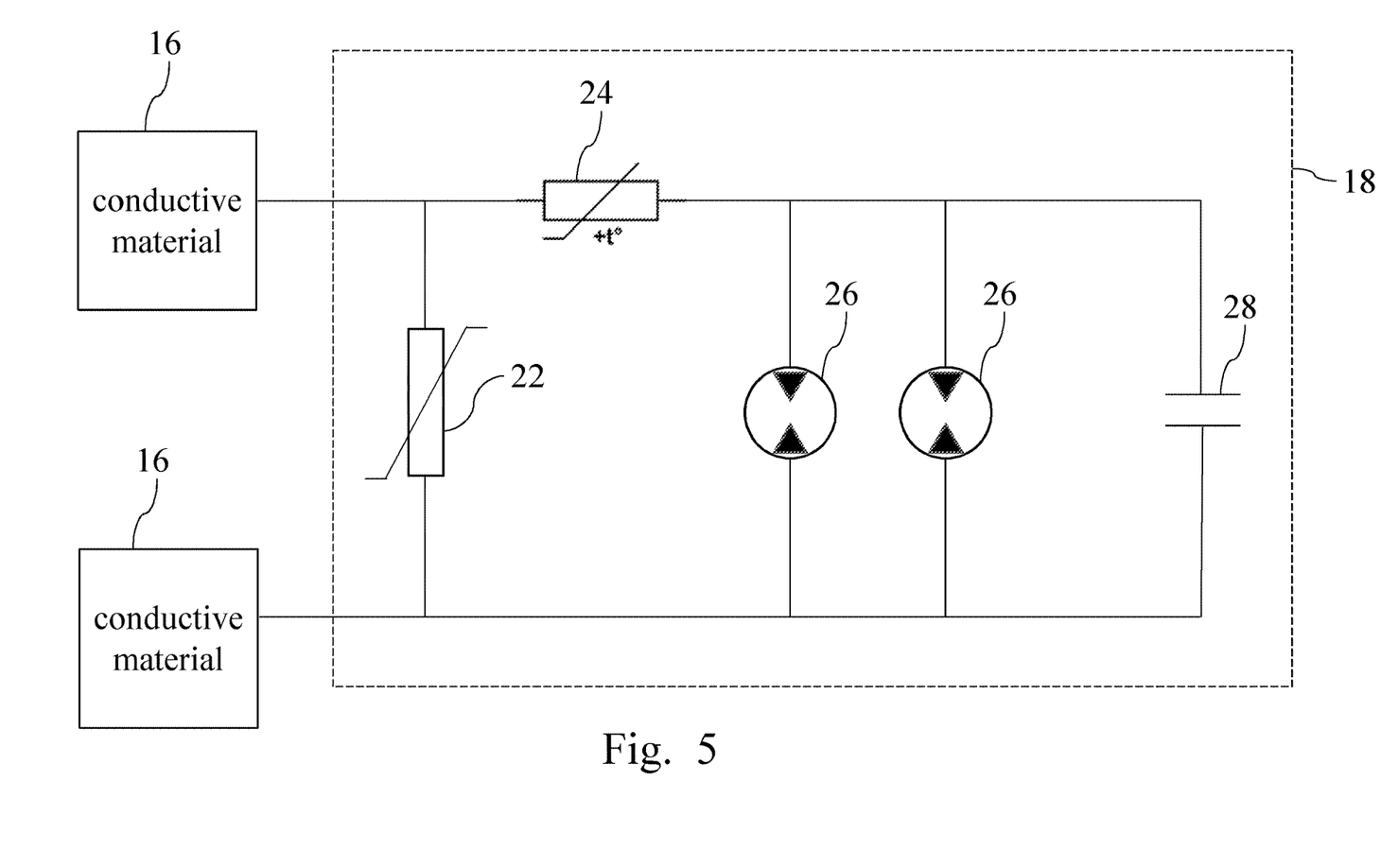
FIG. 5 is a diagram schematically showing an electrostatic eliminating circuit according to another embodiment of the present invention.

Refer to FIG. 4 and FIG. 5. The electrostatic eliminating circuit 18 of FIG. 4 is different from the electrostatic eliminating circuit 18 of FIG. 5 in that the electrostatic eliminating circuit 18 of FIG. 5 further comprises a charge-collecting capacitor 28. Besides, there is a plurality of gas discharge tubes 26. In the embodiment, the number of the gas discharge tubes 26 is two. The electrostatic eliminating circuit 18 is applied to an ultra-high electrostatic voltage. The electrostatic eliminating circuit 18 has a better ability of eliminating static charges. All the gas discharge tubes 26 have different rated voltages. The charge-collecting capacitor 28 is electrically connected to the plurality of gas discharge tubes 26 in parallel. The two conductive materials 16 and the insulating hollow tube from an equivalent capacitor. The capacitance value of the charge-collecting capacitor 28 is larger than ten times of the capacitance value of the equivalent capacitor. The static charges transfer from the insulating hollow tube 20 to the charge-collecting capacitor 28 through the thermistor 24 when the electrostatic voltage is less than the rated voltages of the MOV 22 and the gas discharge tubes 26. The MOV 22, the thermistor 24, and the gas discharge tubes 26 receive and eliminate the static charges to reduce the electrostatic voltage when the electrostatic voltage is larger than the rated voltages of the MOV 22 and the gas discharge tubes 26. The gas discharge tubes 26 convert the static charges into light energy to reduce the electrostatic voltage, such that the electrostatic voltage is equal to the rated voltage of the MOV 22 or the gas discharge tube 26. In order to guarantee the reliability of all the gas discharge tubes 26 and the charge-collecting capacitor 28, the voltage of the gas discharge tube 26 drops to zero whereby high current flows through the thermistor 24 when the electrostatic voltage is higher than the rated voltage of the gas discharge tube 26. When the value of the high current is higher than the trip current value of the thermistor 24, the impedance of the thermistor 24 varies from low to high to block the high current to pass, thereby protecting all the gas discharge tubes 26. In order to improve the ability of eliminating static charges, a plurality of MOV 22 is electrically connected between the two conductive materials 16.

Figure 6:
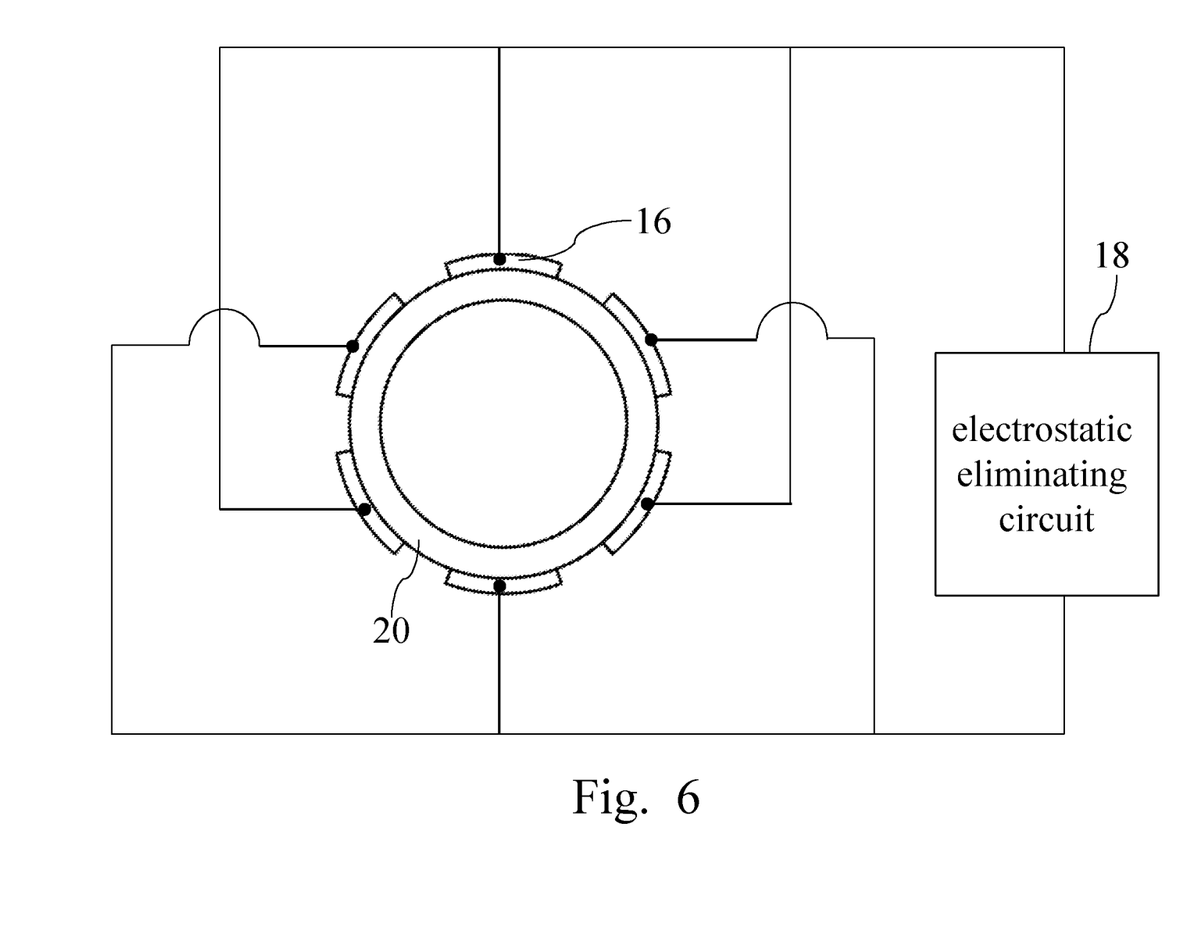
FIG. 6 is a diagram schematically showing an electrostatic discharge device according to the second embodiment of the present invention.

In general, the effect of eliminating static charges is better when the area of the conductive material 16 is larger. In the first embodiment, the capacitance effect and the effect for eliminating static charges of the insulating hollow tube 20 not fully covered by the conductive materials 16 are weaker. In order to overcome the problem, the second embodiment of the present invention is disclosed. Refer to FIG. 6. The second embodiment is different from the first embodiment in the number of the conductive materials 16 of the second embodiment is even and larger than two. The conductive materials 16 are uniformly attached in the circumferential direction of the insulating hollow tube 20. In the second embodiment, the two conductive materials 16 are symmetric to each other with the insulating hollow tube 20 being an axis. All the conductive materials 16 are alternately connected to the electrostatic eliminating circuit 18 to enhance the ability of eliminating static charges. Specifically, neighboring two of the conductive materials 16 are respectively electrically connected to two ends of the electrostatic eliminating circuit 18. In the alternate connecting way, the capacitance effect is more uniformly distributed on the insulating hollow tube 20, such that the static charges are more uniformly discharged from the insulating hollow tube 20 to accumulating the static charges within a specific region. The second embodiment is suitable for the insulating hollow tube 20 having a large sectional diameter.

Figure 7:
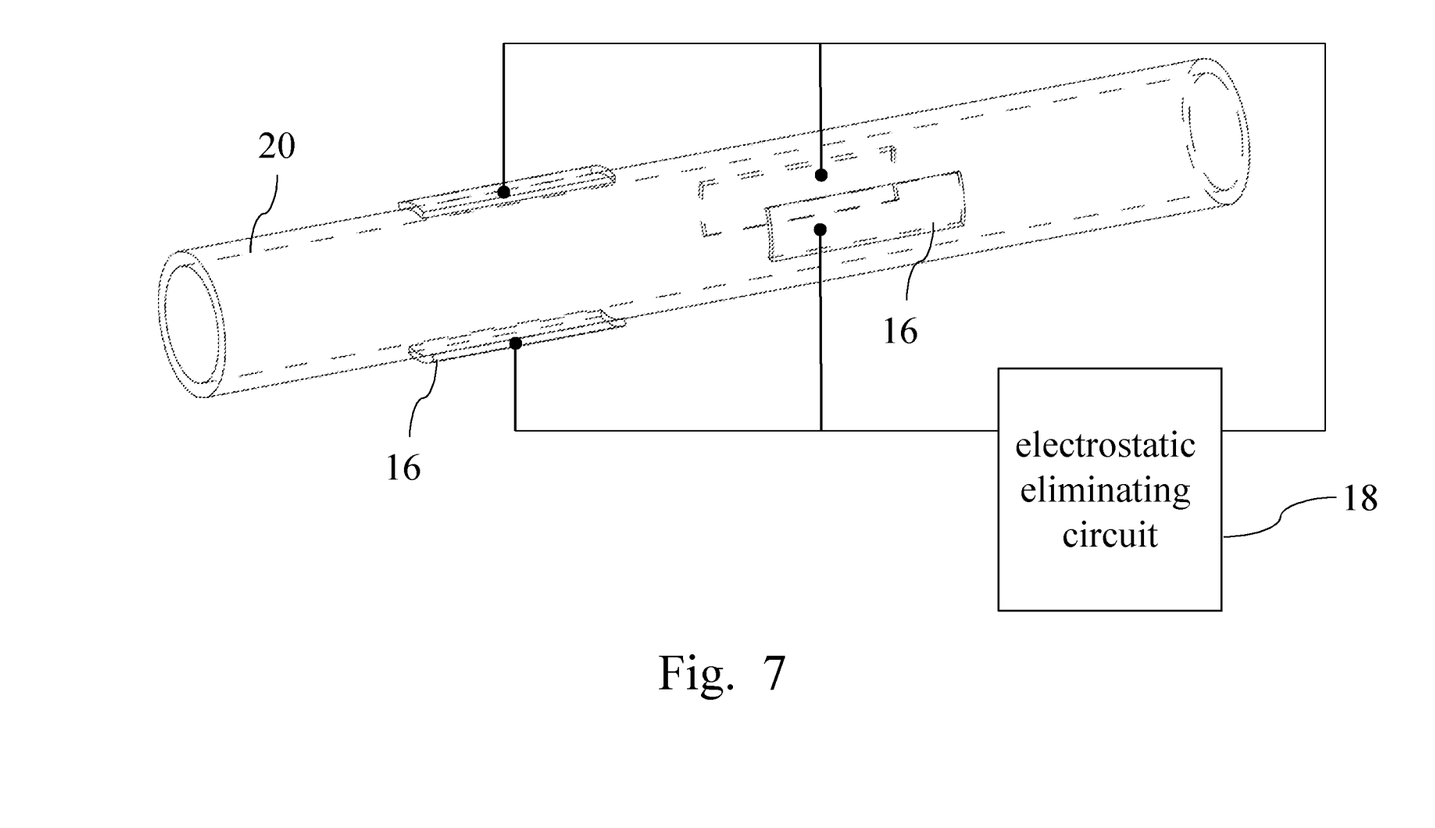
FIG. 7 is a diagram schematically showing an electrostatic discharge device according to the third embodiment of the present invention.

In order to improve the capacitance effect and the effect for eliminating static charges of the insulating hollow tube 20 not covered by the conductive materials 16, the third embodiment of the present invention is disclosed. Refer to FIG. 7. The third embodiment is different from the first embodiment in that the number of the conductive materials 16 of the third embodiment is even and larger than two. In the third embodiment, all the conductive materials 16 are uniformly attached along the tube axis of the insulating hollow tube 20 and the two conductive materials 16 are symmetric to each other with the insulating hollow tube 20 being an axis. For example, the number of the conductive materials 16 is four. The radial direction corresponding to two of the conductive materials 16 is perpendicular to the radial direction corresponding to remains of the conductive materials 16. All the conductive materials 16 are electrically connected to the same electrostatic eliminating circuit 18. The capacitance value of the equivalent capacitor formed by all the conductive materials 16 and the insulating hollow tube 20 should be positive correlated with the number of the conductive materials 16. If the capacitance value of the equivalent capacitor is negative correlated with the number of the conductive materials 16, the capacitance values of the equivalent capacitors formed by all the conductive materials 16 and the insulating hollow tube 20 balance out.

Figure 8:
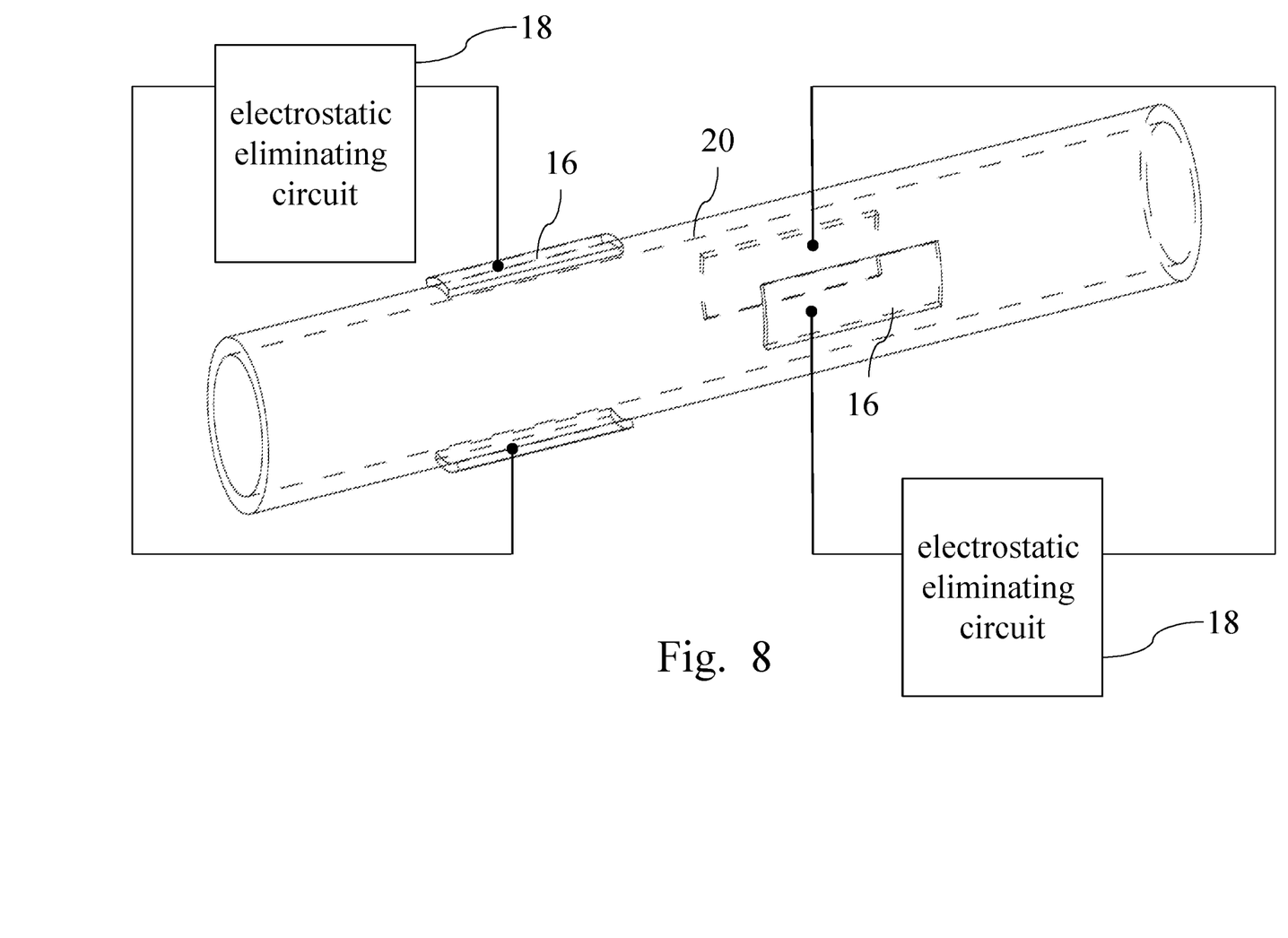
FIG. 8 is a diagram schematically showing an electrostatic discharge device according to the fourth embodiment of the present invention.

If a large number of static charges are accumulated on the insulating hollow tube 20 to generate an ultra-high electrostatic voltage, the present invention provides the fourth embodiment to eliminate the static charges. Refer to FIG. 8. The fourth embodiment is different from the third embodiment in that the number of the electrostatic eliminating circuit 18 of the fourth embodiment is larger than one and each of the electrostatic eliminating circuits 18 is electrically connected to two of the conductive materials 16. The fourth embodiment can obtain the better ability to eliminate static charges.

Figure 9:
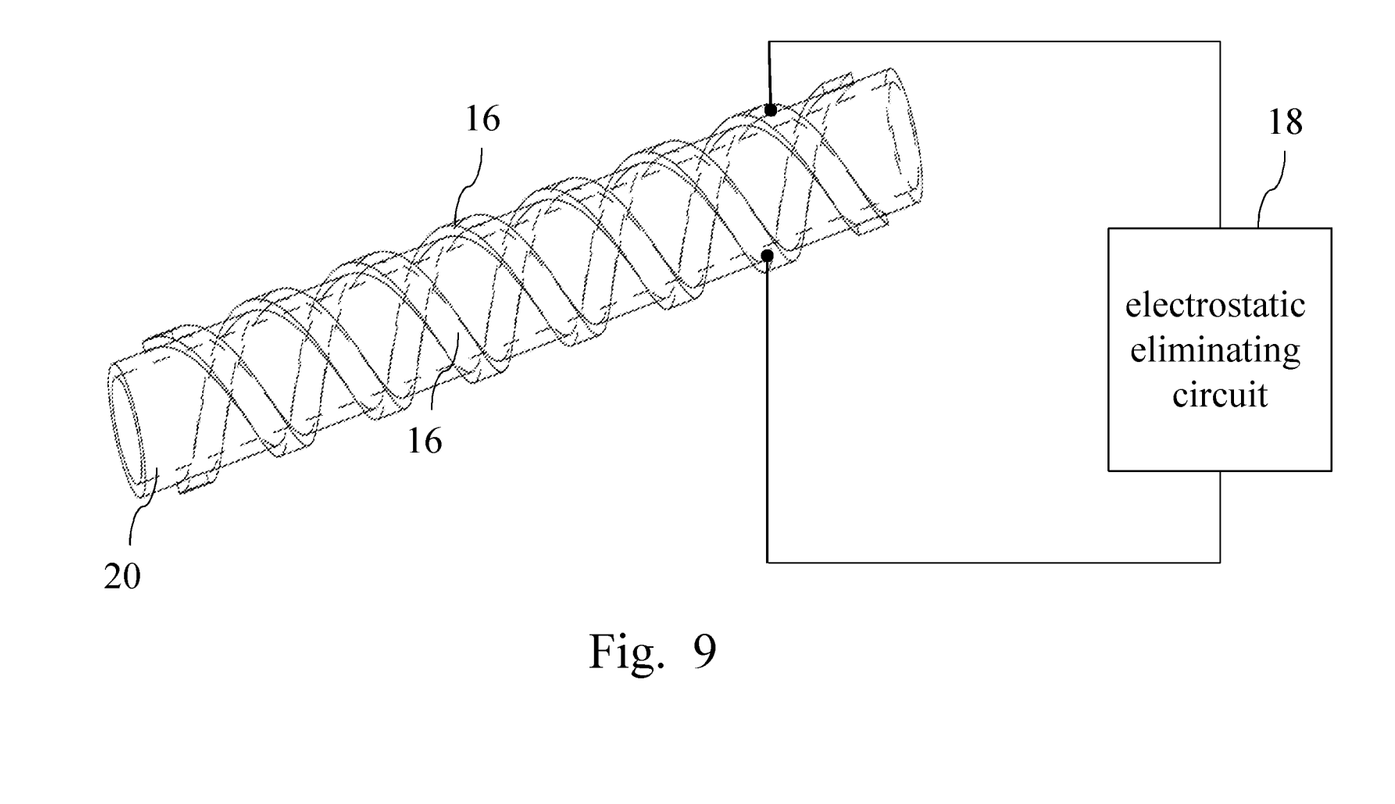
FIG. 9 is a diagram schematically showing an electrostatic discharge device according to the fifth embodiment of the present invention.
Figure 10:
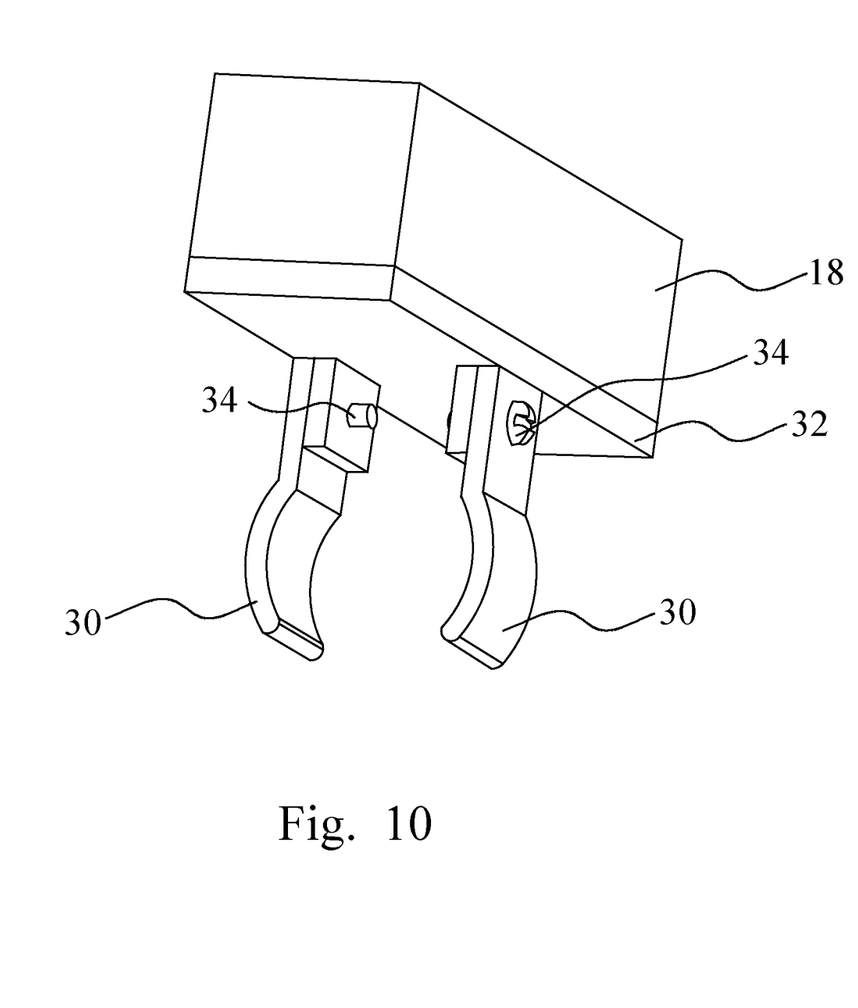
FIG. 10 is a diagram schematically showing arc conductive plates, a printed circuit board, and an electrostatic eliminating circuit according to an embodiment of the present invention.

When the capacitance effect produced by the conductive materials 16 is larger and distributed more uniformly, the ability to eliminate static charges is better. The fifth embodiment of the present invention is provided to satisfy the condition. Refer to FIG. 9. The fifth embodiment is different from the first embodiment in that each of the conductive materials 16 of the fifth embodiment has a shape of a spiral and the two conductive materials 16 are uniformly attached along the tube axis of the insulating hollow tube 20. In the fifth embodiment, the conductive materials 16 spirals along the wall of the insulating hollow tube 20, such that the conductive materials 16 and the insulating hollow tube 20 form a uniform equivalent capacitor, thereby effectively eliminating the static charges.

In the abovementioned embodiments, the electrostatic eliminating circuit 18 is electrically connected to the conductive materials 16 through wires. Alternatively, the electrostatic eliminating circuit 18 is electrically connected to the conductive materials 16 in other ways. Refer to FIG. 3, FIG. 6, FIG. 7, FIG. 8, FIG. 9, and FIG. 10. The electrostatic discharge device further comprises at least two arc conductive plates 30 and at least one printed circuit board 32. Each electrostatic eliminating circuit 18 is correspondingly installed on the two arc conductive plates 30 and the one printed circuit board 32. The shape of the arc conductive plate 30 is designed according to the sectional diameter of the insulating hollow tube 20. The two arc conductive plates 30 respectively clamp the insulating hollow tube 20 through the two conductive materials 16 and respectively electrically connect the two conductive materials 16. The bottom of the printed circuit board 32 is fixed to the two arc conductive plates 30. The top of the printed circuit board 32 is provided with the electrostatic eliminating circuit 18. The two arc conductive plates 30 are electrically connected to the electrostatic eliminating circuit 18 through the printed circuit board 32. For example, the bottom of the printed circuit board 32 is screwed to the two arc conductive plates 30 by screws 34. The arc conductive plates 30 clamp the insulating hollow tube 20 to fix the electrostatic discharge device.

Figure 11:
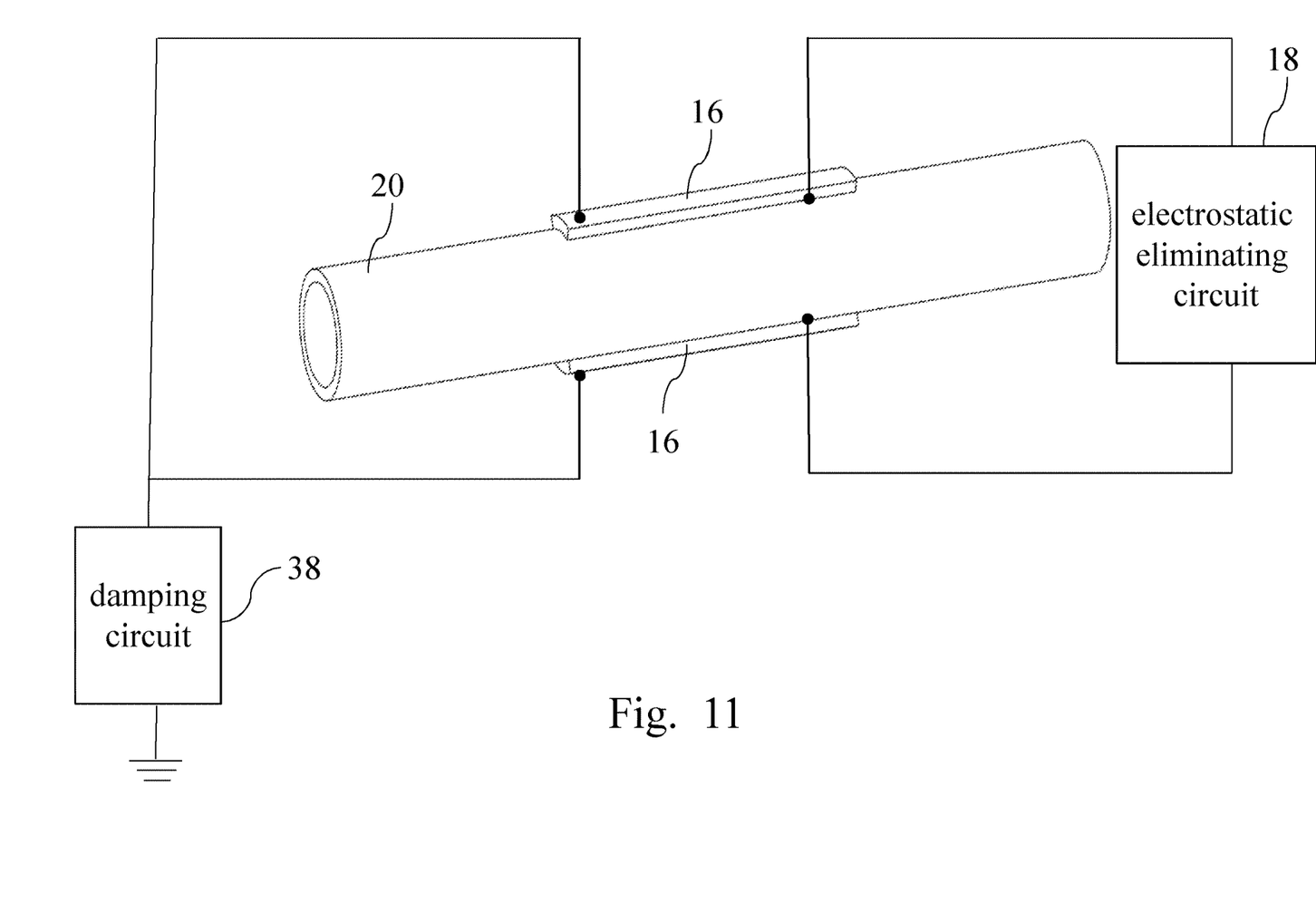
FIG. 11 is a diagram schematically showing an electrostatic discharge device according to the sixth embodiment of the present invention.
Figure 12:
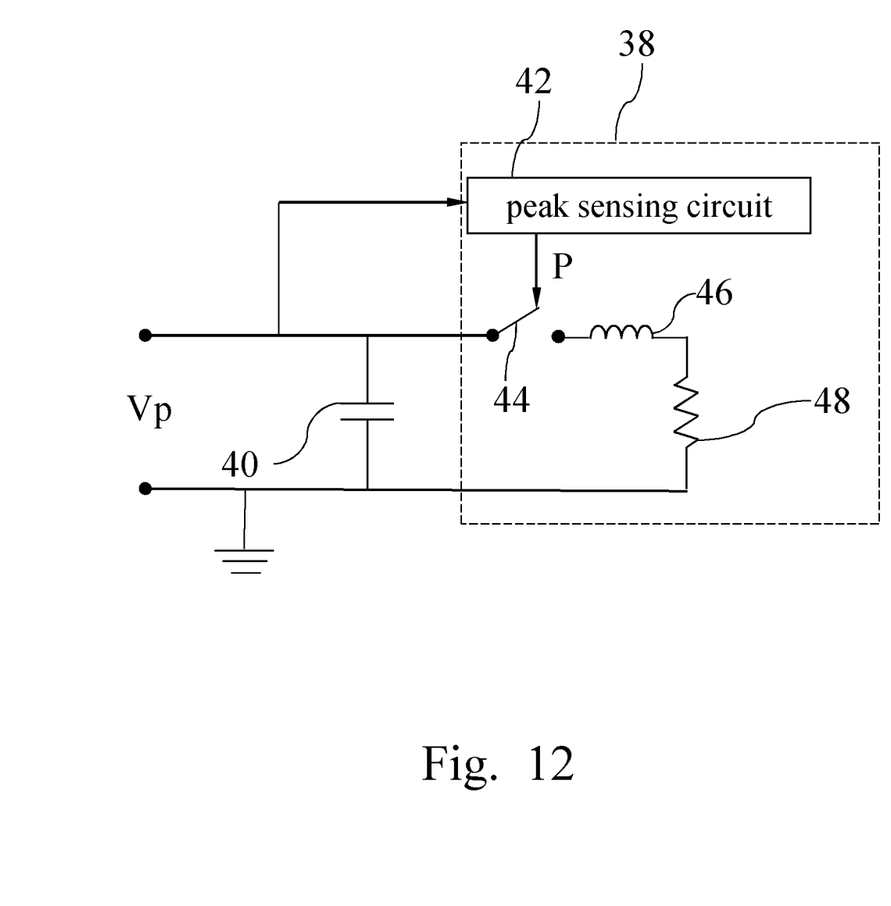
FIG. 12 is a diagram schematically showing a damping circuit and a piezoelectric capacitor according to an embodiment of the present invention.

The sixth embodiment of the present invention is introduced as follows. Refer to FIG. 11 and FIG. 12. The sixth embodiment is different from the first embodiment in that the conductive materials 16 of the sixth embodiment are piezoelectric ceramic plates that are used to block the direct-current (DC) electrostatic voltage. On top of that, the sixth embodiment further comprises a damping circuit 38. Each of the piezoelectric ceramic plates has a first conductive surface and a second conductive surface, the first conductive surface of each piezoelectric ceramic plate is attached to the outer wall of the insulating hollow tube 20 and electrically connected to the electrostatic eliminating circuit 18. The second conductive surface of each of the piezoelectric ceramic plates and the grounding terminal are electrically connected to the damping circuit 38. When the fluid flows through the insulating hollow tube 20, the insulating hollow tube 20 vibrates. When the insulating hollow tube 20 generates a vibration strain, the piezoelectric ceramic plates converts the vibration strain into a vibration voltage Vp, and the damping circuit 38 receives and inverts the vibration voltage Vp to increase the damping of the insulating hollow tube 20 and reduce the vibration strain, thereby suppressing vibration. When the vibration strain is reduced, the friction between the liquid and the inner wall of the insulating hollow tube 20 or the probability of generating turbulence is reduced to decrease the number of static charges.

In the sixth embodiment, the piezoelectric ceramic plates and the grounding terminal form a piezoelectric capacitor 40 having a first connecting end and a second connecting end. The first connecting end of the piezoelectric capacitor 40 is electrically connected to the two second conductive surface of each of the piezoelectric ceramic plates, and the second connecting end of the piezoelectric capacitor 40 is electrically connected to the grounding terminal. The vibration voltage Vp is applied across the first connecting end and the second connecting end of the piezoelectric capacitor 40. The damping circuit 38 further comprises a peak sensing circuit 42, an electrical switch 44, an inductor 46 and a resistor 48. The peak sensing circuit 42, electrically connected to the first connecting end of the piezoelectric capacitor 40, receives the vibration voltage Vp. The peak sensing circuit 42 generates a pulse signal P when the vibration voltage Vp reaches a maximum value. The electrical switch 44 is electrically connected to the peak sensing circuit 42 and the first connecting end of the piezoelectric capacitor 40 and turned off. The electrical switch is turned on when the electrical switch 44 receives the pulse signal P. The inductor 46 and the resistor 48 are connected in series and electrically connected between the electrical switch 44 and the grounding terminal. The inductor 46 is electrically connected between the resistor 48 and the electrical switch 44. The inductor 46 resonates with the piezoelectric capacitor 40 to invert the vibration voltage Vp and increase the damping when the electrical switch 44 is turned on.

The electrical switch 44, the inductor 46, and the piezoelectric capacitor 40 have to satisfy equation (1), wherein t is time that the electrical switch 44 is turned on, L is an inductance value of the inductor 46, and C is a capacitance value of the piezoelectric capacitor 40.

$$t = \frac{1}{\pi}\sqrt{LC} \qquad (1)$$

Piezoelectric material has a governing equation in structure expressed by equation (2).

$$M\ddot{x}+D\dot{x}+Kx=\theta V \qquad (2)$$

M, D, K, $\theta$, x, and V respectively represent mass, a damping coefficient, an elastic coefficient, an electromechanical coupling coefficient, structural displacement and a piezoelectric voltage. The superscript "˙" represents the differentiation of time. In general, when the piezoelectric material is in an open state, the detected piezoelectric voltage is in phase with the structural displacement. However, when the damping circuit 38 is applied to the piezoelectric material, the structural displacement and the piezoelectric voltage have a phase difference of 90 degrees. In other words, the vibration velocity $\dot{x}$ of the piezoelectric material is in phase with the piezoelectric voltage, as shown in equation (3).

$$V=-\alpha\dot{x} \qquad (3)$$

Wherein, $\alpha$ is the equivalent ratio of the piezoelectric voltage to the vibration velocity. Substituting equation (3) into equation (2) leads to equation (4).

$$M\ddot{x}+(D+\theta\alpha)\dot{x}+Kx=0 \qquad (4)$$

From equations (4) and (2), it is known that the damping coefficient of the piezoelectric material increases to (D+$\theta\alpha$) from D due to the phase difference of 90 degrees. The additional damping effect produced by the piezoelectric material is applied to the insulating hollow tube 20 to reduce the vibration of the insulating hollow tube 20, thereby decreasing the friction between the fluid and the wall of the insulating hollow tube 20 and the number of the static charges. It is noted that the damping circuit 38 is semi-active or completely passive. That is to say, the damping circuit 38 may not require power. The peak sensing circuit 42 directly uses electric energy harvested from the piezoelectric material to start the electrical switch 44. The damping circuit 38 does not have a problem with maintenance.

In conclusion, the present invention uses at least two conductive materials separating from each other to effectively eliminate an ultra-high electrostatic voltage of an isolating hollow tube and avoids the disturbance of noises from a grounding terminal.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. An electrostatic discharge device comprising:
   at least two conductive materials, attached to an outer wall of an insulating hollow tube, separating from each other and overlapping in a radial direction of the insulating hollow tube, when liquid carrying static charges flows through and rubs against the insulating hollow tube, the static charges are accumulated on the insulating hollow tube to generate an electrostatic voltage across the at least two conductive materials; and
   at least one electrostatic eliminating circuit, electrically connected to the at least two conductive materials and disconnected from a grounding terminal, receiving and eliminating the static charges through the at least two conductive materials to reduce the electrostatic voltage.

2. The electrostatic discharge device according to claim 1, wherein the at least one electrostatic eliminating circuit further comprises:
   at least one metal oxide varistor (MOV) having a first end and a second end, and the first end and the second end are respectively electrically connected to the at least two conductive materials;
   a thermistor having a third end and a fourth end, and the third end is electrically connected to the first end; and
   at least one gas discharge tube with two ends thereof respectively electrically connected to the fourth end and the second end, and the MOV, the thermistor, and the at least one gas discharge tube receive and eliminate the static charges to reduce the electrostatic voltage when the electrostatic voltage is larger than rated voltages of the MOV and the at least one gas discharge tube.

3. The electrostatic discharge device according to claim 2, wherein the thermistor is a positive temperature coefficient (PTC) thermistor or a polymer positive temperature coefficient (PPTC) thermistor.

4. The electrostatic discharge device according to claim 2, wherein the at least one gas discharge tube further comprises at least two gas discharge tubes, the rated voltages of the two gas discharge tubes are different, the at least one electrostatic eliminating circuit further comprises a charge-collecting capacitor electrically connected to the at least two gas discharge tubes in parallel, the at least two conductive materials and the insulating hollow tube form an equivalent capacitor, a capacitance value of the charge-collecting capacitor is larger than ten times of a capacitance value of the equivalent capacitor, the static charges transfers from the insulating hollow tube to the charge-collecting capacitor through the thermistor when the electrostatic voltage is less than the rated voltages of the MOV and the at least two gas discharge tubes, and the MOV, the thermistor, and the at least two gas discharge tubes receive and eliminate the static charges to reduce the electrostatic voltage when the electrostatic voltage is larger than the rated voltages of the MOV and the at least two gas discharge tubes.

5. The electrostatic discharge device according to claim 1, further comprising:
  at least two arc conductive plates respectively clamping the insulating hollow tube through the at least two conductive materials; and
  at least one printed circuit board with a bottom thereof fixed to the at least two arc conductive plates, a top of the at least one printed circuit board is provided with the at least one electrostatic eliminating circuit, and the at least two arc conductive plates are electrically connected to the at least one electrostatic eliminating circuit through the at least one printed circuit board.

6. The electrostatic discharge device according to claim 1, wherein the at least two conductive materials are arc metal plates, conductive tapes, conductive adhesives, conductive paint, or piezoelectric ceramic plates.

7. The electrostatic discharge device according to claim 1, further comprising a damping circuit, the at least two conductive materials are piezoelectric ceramic plates, each of the piezoelectric ceramic plates has a first conductive surface and a second conductive surface, the first conductive surface is attached to the outer wall of the insulating hollow tube and electrically connected to the at least one electrostatic eliminating circuit, the second conductive surface of each of the piezoelectric ceramic plates and the grounding terminal are electrically connected to the damping circuit, when the insulating hollow tube generates a vibration strain, the piezoelectric ceramic plates converts the vibration strain into a vibration voltage, and the damping circuit receives and inverts the vibration voltage to reduce the vibration strain.

8. The electrostatic discharge device according to claim 7, wherein the piezoelectric ceramic plates and the grounding terminal form a piezoelectric capacitor having a first connecting end and a second connecting end, the first connecting end is electrically connected to the second conductive surface of each of the piezoelectric ceramic plates, the second connecting end is electrically connected to the grounding terminal, the vibration voltage is applied across the first connecting end and the second connecting end, and the damping circuit further comprises:
  a peak sensing circuit, electrically connected to the first connecting end, receiving the vibration voltage, and the peak sensing circuit generates a pulse signal when the vibration voltage reaches a maximum value;
  an electrical switch electrically connected to the peak sensing circuit and the first connecting end and turned off, and the electrical switch is turned on when the electrical switch receives the pulse signal; and
  an inductor and a resistor connected in series and electrically connected between the electrical switch and the grounding terminal, the inductor is electrically connected between the resistor and the electrical switch, and the inductor resonates with the piezoelectric capacitor to invert the vibration voltage when the electrical switch is turned on.

9. The electrostatic discharge device according to claim 1, wherein number of the at least two conductive materials is even and larger than two.

10. The electrostatic discharge device according to claim 9, wherein the at least two conductive materials are uniformly attached in a circumferential direction of the insulating hollow tube, the at least two conductive materials are symmetric to each other with the insulating hollow tube being an axis, and neighboring two of the at least two conductive materials are respectively electrically connected to two ends of the at least one electrostatic eliminating circuit.

11. The electrostatic discharge device according to claim 9, wherein the at least two conductive materials are uniformly attached along a tube axis of the insulating hollow tube and the at least two conductive materials are symmetric to each other with the insulating hollow tube being an axis.

12. The electrostatic discharge device according to claim 11, wherein number of the at least one electrostatic eliminating circuit is larger than one and each of the electrostatic eliminating circuits is electrically connected to two of the conductive materials.

13. The electrostatic discharge device according to claim 11, wherein number of the at least two conductive materials is four, and the radial direction corresponding to two of the conductive materials is perpendicular to the radial direction corresponding to remains of the conductive materials.

14. The electrostatic discharge device according to claim 1, wherein each of the at least two conductive materials has a shape of a spiral and the at least two conductive materials are uniformly attached along a tube axis of the insulating hollow tube.

* * * * *